(12) United States Patent
Boecker et al.

(10) Patent No.: US 7,715,275 B2
(45) Date of Patent: May 11, 2010

(54) START ASSIST SYSTEM FOR MOTOR VEHICLES

(75) Inventors: Juergen Boecker, Stuttgart (DE); Dieter Hoetzer, Markgroenningen (DE); Silvia Citelli, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 11/664,237

(22) PCT Filed: Jul. 20, 2005

(86) PCT No.: PCT/EP2005/053498

§ 371 (c)(1),
(2), (4) Date: Mar. 29, 2007

(87) PCT Pub. No.: WO2006/034893

PCT Pub. Date: Apr. 6, 2006

(65) Prior Publication Data

US 2007/0297288 A1 Dec. 27, 2007

(30) Foreign Application Priority Data

Sep. 29, 2004 (DE) .................. 10 2004 047 177

(51) Int. Cl.
*G01S 15/93* (2006.01)
*B60T 7/12* (2006.01)
(52) U.S. Cl. .................. 367/96; 367/99; 367/909; 701/96
(58) Field of Classification Search .................. 701/96; 367/87, 96, 99, 909
See application file for complete search history.

(56) References Cited

U.S. PATENT DOCUMENTS

2007/0208482 A1* 9/2007 Thiede et al. .................. 701/70

FOREIGN PATENT DOCUMENTS

GB 2 309 555 7/1997
JP 406270780 A * 9/1994

* cited by examiner

*Primary Examiner*—Ian J Lobo
(74) *Attorney, Agent, or Firm*—Kenyon & Kenyon LLP

(57) ABSTRACT

A start assist system for motor vehicles, including a long-range locating system for determining the location of vehicles traveling ahead and a starting regulator for initiating and controlling a starting operation, wherein the locating system is combined with a near-range locating system for determining the location of objects directly ahead of the host vehicle and a decision unit is designed to suppress the starting operation in response to a signal from the near-range locating system.

13 Claims, 2 Drawing Sheets

START ASSIST SYSTEM FOR MOTOR VEHICLES

FIELD OF THE INVENTION

The present invention relates to a start assist system for motor vehicles, having a long-range locating system for determining the location of vehicles traveling ahead and having a starting regulator for initiating and controlling a starting operation.

BACKGROUND INFORMATION

Motor vehicles are increasingly being equipped with assist systems which support the driver in driving the vehicle and relieve him of certain tasks. One example of such an assist system is an ACC system (Adaptive Cruise Control) which permits automatic speed regulation and automatic regulation of the distance from a vehicle traveling ahead. Advanced systems of this type are being developed and make it possible to automatically brake the host vehicle to a standstill, e.g., when approaching the tail end of a traffic jam, and also permit automatic start when the vehicle ahead begins moving again. Systems of this type have also been proposed for use in city traffic. A start assist system is understood to refer to that part of such a system which controls automatic resumption of driving of the vehicle after a standstill.

The long-range locating system is usually a radar system (LRR; long-range radar), optionally in combination with a video and image processing system.

Many vehicles are also equipped with a park assist system in which ultrasonic sensors are used as near-range sensors.

SUMMARY

The present invention provides a start assist system having increased traffic safety.

An example embodiment of the present invention provides a long-range locating system as well as a near-range locating system enabling the locating of objects, e.g., pedestrians, cyclists or the like, that are directly in front of the host vehicle, even if these objects are in the blind spot of the long-range locating system. A decision unit analyzes the measured data of the near-range locating system and ensures that the starting operation is terminated or is not even initiated when objects are located in front of the host vehicle by the near-range locating system. This greatly reduces the risk that situations involving objects situated in the blind spot of the long-range locating system directly in front of the vehicle might result in accidents.

The near-range locating system preferably has one or more ultrasonic sensors. These are preferably ultrasonic sensors which are present on the vehicle anyway as components of the park assist system. This permits a considerable increase in traffic safety without requiring additional complex sensors.

If the near-range locating system has only a very short locating depth, as is the case with ultrasonic sensors in particular, the blind spot may not be eliminated completely even by combining the long-range locating system with the near-range locating system. In unfavorable cases, objects causing a risk of collision may be located in the blind spot of the radar sensor while at the same time being far enough away from the vehicle that they cannot be detected by the near-range locating system. A refinement of the present invention provides an initial starting regulator for these cases which controls specifically the initial phase of the starting operation until the vehicle has traveled a certain starting distance. The initial starting regulator uses an algorithm which allows only a limited maximum speed either by directly limiting the speed or by limiting the starting acceleration. The maximum speed is selected in such a way that the stopping distance resulting from this speed is shorter than the range of the near-range locating system. If an object is in the remaining blind spot, this object will eventually enter the locating range of the near-range locating system, thus ensuring that it is still possible to stop the vehicle again promptly before it collides with the object. The maximum speed is preferably selected in such a way that the stopping distance is shorter by a certain safety margin than the locating depth of the near-range locating system.

The initial starting regulator is preferably designed to be capable of intervening in the vehicle's brake system and automatically triggering a braking operation when an object enters the locating range of the near-range locating system during the initial phase of the starting operation.

When the vehicle has traveled the above-mentioned starting distance, it switches to the regular starting regulator, which allows greater accelerations and speeds, so that the starting operation may be continued promptly and the host vehicle keeps pace with the preceding vehicle.

Typical situations that may be controlled by using the start assist system according to the present invention include, for example, persons attempting to cross a road in city traffic while a line of vehicles are stopped at a red light, or when people get out of their cars, e.g., when there is a traffic jam on a highway, and are still in the lane of the host vehicle when the traffic jam breaks up. Such situations occur most commonly in the initial phase of the starting operation and their frequency declines significantly when the line of cars has begun to move. By selecting a suitable starting distance during which the initial starting regulator is active, it is thus possible to significantly reduce the risk of an accident.

In a particularly preferred embodiment, the starting distance is selected to be large enough so that it is still possible for the radar beam (which becomes wider with an increase in distance) of the long-range locating system to determine the location of objects at a greater distance from the front edge of the locating range of the near-range locating system than the starting distance. The blind spot is effectively eliminated completely in this way, despite the limited range of the near-range locating system.

The near-range locating system is preferably assigned a plausibility module which evaluates the plausibility of the locating results. The plausibility may depend, for example, on the strength of the locating signal, the period of time during which this signal occurs and, in the case of signals from multiple ultrasonic sensors, it also depends on the consistency of these signals as well as the transverse position of the located object as determined by triangulation. Automatic initiation of a braking operation in the initial phase of the starting operation should preferably occur only above a certain plausibility level to avoid any negative effects on comfort or annoyance to the following traffic due to faulty deployment. If the signal has a low plausibility, only the acceleration procedure should be interrupted temporarily and/or a warning should be output to the driver, e.g., in the form of an acoustic signal.

BRIEF DESCRIPTION OF THE DRAWINGS

An exemplary embodiment of the present invention is depicted in the figures and explained in greater detail below.

DETAILED DESCRIPTION OF EXAMPLE EMBODIMENTS

Figure 1:
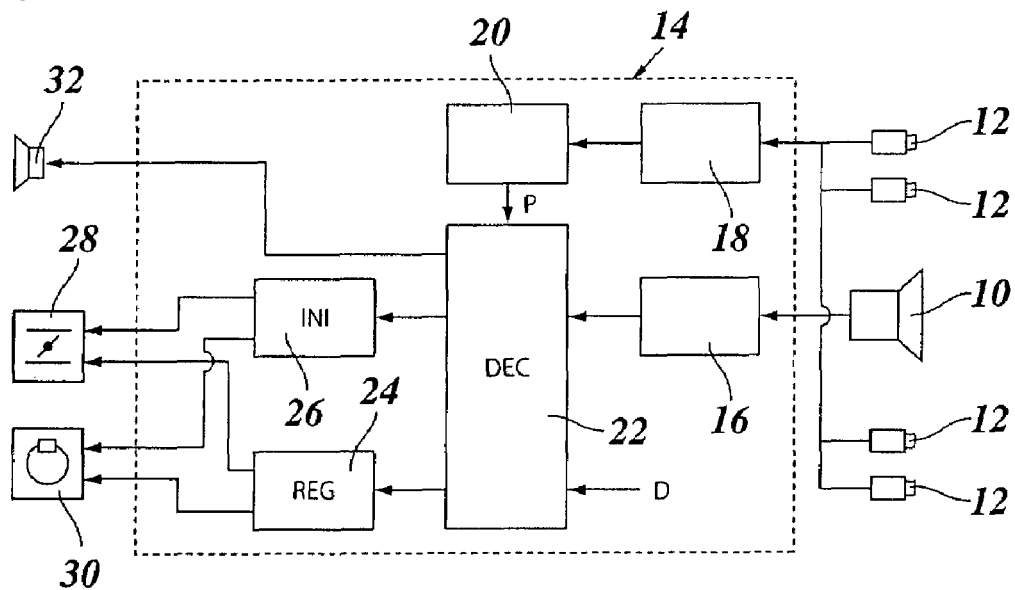
FIG. 1 shows a block diagram of a start assist system.

The start assist system illustrated in FIG. 1 includes a radar sensor 10, multiple ultrasonic sensors 12 and a data processing system 14. Radar sensor 10 is installed in the front of the vehicle and functions as a long-range locating system for determining the location of vehicles traveling ahead and other objects at a greater distance from the vehicle.

Ultrasonic sensors 12 together form a near-range locating system and are installed, e.g., in the front bumper of the vehicle to determine the location of objects directly ahead of the vehicle. Ultrasonic sensors 12 are preferably also part of a park assist system (not shown).

Data processing system 14 is formed by one or more microcomputers, for example, and the particular software as well as peripheral systems, and in addition to performing the functions explained here, it is also capable of performing other functions involved in an ACC system. Only the system components of data processing system 14 that are important for explaining the present invention are presented and described here. These components may be implemented as specialized hardware or as software modules. Specifically, data processing system 14 includes a data processing unit 16 for radar sensor 10, a data processing unit 18 for ultrasonic sensors 12, a plausibility module 20, a decision unit 22, and two starting regulators 24, 26.

Data processing unit 16 analyzes the data of radar sensor 10 and uses this data to calculate the distances, relative speeds, and azimuth angles of the located objects, in particular of the vehicles traveling ahead. Data processing unit 18 analyzes the data of ultrasonic sensors 12 and uses this data to calculate the distances and—e.g., by triangulation—the transverse positions of the objects located by the ultrasonic sensors. Plausibility module 20 performs a plausibility and relevance analysis on the data supplied by data processing unit 18 to differentiate real and relevant objects that could result in a risk of collision from illusory objects and irrelevant objects. Criteria for this plausibility evaluation include, for example, the amplitudes of the signals received by ultrasonic sensors 12, the period during which the signals for a certain object last, the consistency between the signals received by the various ultrasonic sensors (on the same side of the vehicle) and the transverse positions of the objects. In this way, very small objects such as cans on the roadside and the like or objects that appear only transiently such as a bird flying past may be eliminated as illusory objects, and objects that are far enough to the side of the vehicle may be eliminated as irrelevant objects. The plausibility and relevance of a located object are represented by a plausibility parameter P, which is sent to decision unit 22.

In addition to plausibility parameter P, decision unit 22 receives as input signals the position data calculated by data processing unit 16 for the objects located by radar sensor 10 and a distance signal D, which indicates the distance traveled by the vehicle since the start of a starting operation. On the basis of this data, decision unit 22 decides about the activation and deactivation of two starting regulators 24, 26, and the position data of each of the objects located by radar sensor 10 is forwarded to the active starting regulator.

Starting regulator 24 is a "regular" starting regulator such as is also used in known start assist systems and it controls, i.e., regulates, the starting operation as a function of the position data of radar sensor 10. To this end, starting regulator 24 intervenes in drive system 28 of the vehicle. If necessary, starting regulator 24 also intervenes in brake system 30 of the vehicle, e.g., when the vehicle traveling ahead stops again. In vehicles with automatic transmission, the vehicle brake must also be activated when at a standstill, i.e., before the starting operation, in order to prevent the vehicle from rolling.

Second starting regulator 26 is provided specifically for the initial phase of a starting operation and will therefore be referred to as the initial starting regulator. This regulator controls the starting operation in a manner similar to that of regular starting regulator 24 but it allows only lower starting accelerations and speeds, as is explained in greater detail below. Furthermore, initial starting regulator 26 is designed to brake a vehicle to a standstill at a relatively great deceleration rate, i.e., to perform a type of emergency braking if an object is located by ultrasonic sensors 12 in the near range during the initial phase of the starting operation.

A warning signal transmitter 32 (e.g., acoustic) is provided to generate a warning signal for the driver on command by decision unit 22 when an object is detected in the near range.

Figure 2:
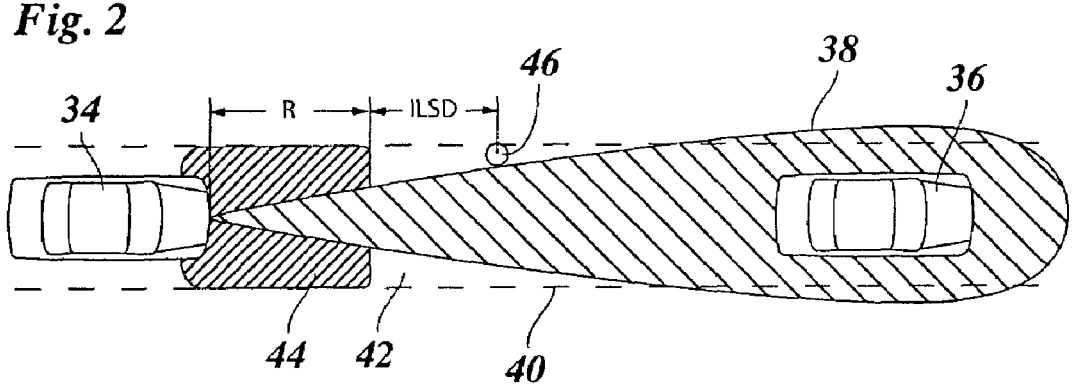
FIG. 2 shows a diagram to illustrate the functioning of the start assist system.

FIG. 2 shows a vehicle 34 equipped with the start assist system described above and another vehicle 36, which is driving or stopping in the same lane directly ahead of this vehicle and is located by radar sensor 10. Locating range 38 of radar sensor 10 is indicated by hatching. The range of this radar sensor, which is also used for the normal ACC function when driving at a higher speed, may be e.g., 100 meters or more. Locating range 38 is in the form of a "beam" covering the entire width of a lane 40 of vehicle 34 at distances corresponding to normal vehicle distances. The borders of lane 40 are indicated by dashed lines in FIG. 2. For safety reasons, the lane is assumed to be somewhat wider than the width of vehicle 34. Locating range 38 becomes narrower with decreasing distance from vehicle 34 and then no longer covers the entire width of the lane, resulting in blind spots 42 on the right and left of the radar beam.

FIG. 2 also shows locating range 44 of ultrasonic sensors 12. This locating range covers the entire width of lane 40 but it has only a relatively small depth of 4 meters, for example. Blind spot 42 is reduced in size by ultrasonic sensors 12 but is not eliminated completely, as shown in FIG. 2.

To illustrate the operation of the start assist system, a starting operation will now be described with reference to FIG. 2. To do so, it is assumed that both vehicles 34 and 36 are initially stationary and then vehicle 36 starts moving. This is registered by radar sensor 10 and the information is relayed to decision unit 22. The decision unit then checks whether ultrasonic sensors 12 have determined the location of an object in the near range, i.e., in locating range 44. If this is the case, decision unit 22 causes both starting regulators 24 and 26 to be inactive so that vehicle 34 remains stationary. The driver may optionally be informed of this situation by a visual or acoustic signal.

If there is no object in the near range, decision unit 22 activates initial starting regulator 26 and vehicle 34 starts moving. In this situation, however, it is possible for an object 46, e.g., a pedestrian, to be in blind spot 42 outside of locating range 44. The location of object 46 is determined by the ultrasonic sensors only when vehicle 34 has traveled a certain distance after starting, this distance being labeled as ILSD in FIG. 2.

Initial starting regulator 26 is therefore designed in such a way that vehicle 34 does not exceed a certain maximum speed Vimax during starting, this maximum speed being selected to allow vehicle 34 to be stopped promptly if the ultrasonic sensors determine the location of object 46 for the first time and then initial starting regulator 26 initiates the "emergency braking" mentioned above. A collision with object 46 is reliably avoided in this way, despite the remaining blind spot.

In the situation depicted in FIG. 2, object 46 is the greatest possible distance from vehicle 34 under the condition that it is within lane 40 and at the same time is outside of locating range 38 of the radar sensor. In other words, if object 46 were an even greater distance from vehicle 34, it would already be located by radar sensor 10 and would form the target object for the starting regulator instead of vehicle 36, so that vehicle 34 would not start moving at all based on the normal function of the starting regulator.

Let it now be assumed that object 46 is not present. If vehicle 34 has then traveled distance ILSD and no object has been located by ultrasonic sensors 12, this means that there is no object in the blind spot and therefore the lane is free. For this reason, decision unit 22 checks on the basis of distance signal D whether the vehicle has traveled distance ILSD (initial slow driving safety distance); as soon as this is the case, there is a switch from initial starting regulator 26 to regular starting regulator 24, which allows higher acceleration so that the starting operation is continued promptly.

The sum of locating depth R of ultrasonic sensors 12 and distance ILSD is given by the geometry of the radar beam of radar sensor 10 and the width of lane 40, which equals 7 meters in the example depicted in FIG. 2. Maximum speed Vimax for initial starting regulator 26 then depends on locating depth R of the ultrasonic sensors and the following other parameters: the maximum braking deceleration that may be achieved during the braking operation controlled by the initial starting regulator, the starting acceleration during the initial phase of the starting operation (more precisely: the acceleration at the moment when the position of object 46 is determined for the first time), the "braking jolt," i.e., the maximum allowed change in acceleration and/or braking deceleration, an unavoidable lag time between the point in time when the position of object 46 is determined and the point in time when the braking operation actually becomes effective, and a desired safety distance to be maintained between vehicle 34 and object 46 after the vehicle has come to a standstill.

Figure 3:
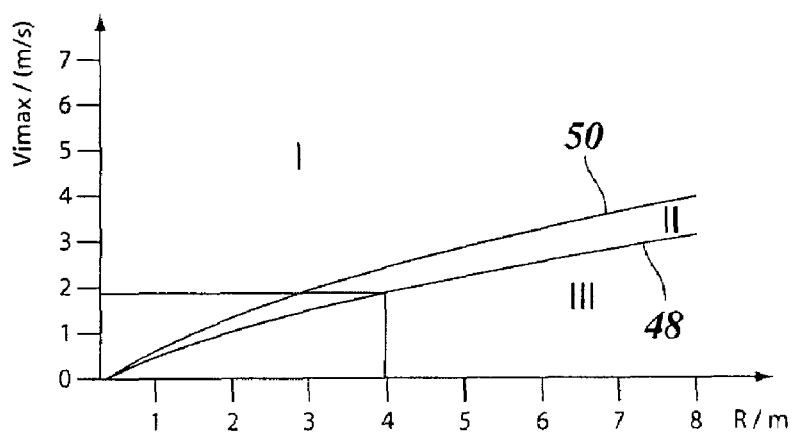
FIG. 3 shows a graph illustrating the relationship between the range of the near-range locating system and the allowed maximum speed in the initial phase of the starting operation.

FIG. 3 shows an example of the relationship thus found between maximum speed Vimax and locating depth R of the ultrasonic sensors. The following values were used as the basis for the aforementioned parameters:

Braking deceleration: $-2.0 \text{ m/s}^2$
Starting acceleration: $1.5 \text{ m/s}^2$
Braking jolt: $-7.0 \text{ m/s}^3$
Lag time: 0.3 s
Safety distance: 0.2 m Curve 48 in FIG. 3 describes this relationship for the aforementioned safety distance of 0.2 m. Curve 50 describes this relationship for safety distance 0. Therefore, the vehicle comes to a standstill in range III in FIG. 3 at a distance of more than 0.2 m from object 46. In range II a collision is still preventable even though the vehicle comes to a standstill at a distance of less than 0.2 m from the object. In range I in FIG. 3 a collision occurs.

If locating depth R of radar sensors 12 is 4 meters, a maximum speed Vimax of approximately 1.8 m/s may be obtained from FIG. 3. The starting acceleration during the initial phase of the starting operation is then expediently selected so that this maximum speed is reached when the vehicle has traveled distance ILSD.

In practice, the maximum speed and initial starting acceleration may not be selected to be indefinitely small. If certain realistic specifications are set for these parameters, it is possible to use FIG. 3 to determine locating depth R of ultrasonic sensors 12 or another suitable near-range locating system.

Figure 4:
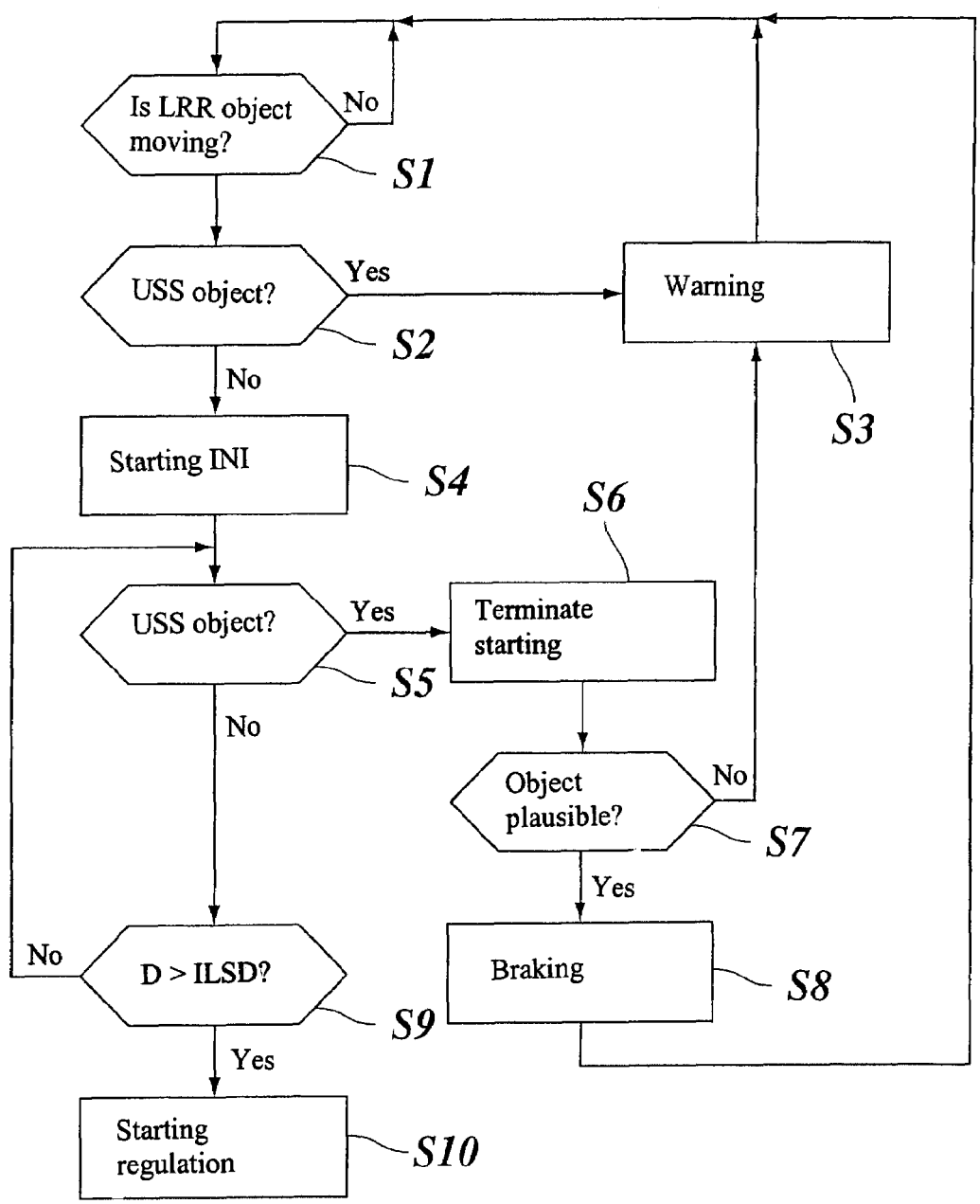
FIG. 4 shows a flow chart to illustrate the operation of a decision unit in the start assist system.

FIG. 4 shows the processes described above again as a flow chart.

A check is performed in step S1 to determine whether the target object detected by the radar sensor (LRR) is starting to move. This step is repeated cyclically until the object starts to move. A check is then performed in step S2 to determine whether the ultrasonic sensors (USS) have detected an object. The plausibility of the object is not yet taken into account or a very low plausibility threshold is used. If an object is detected, a warning is output to the driver in step S3 and the sequence jumps back to step S1, i.e., the vehicle does not start. If no object is detected in step S2, the starting procedure is controlled by initial starting regulator 26 in step S4. If, during this initial starting phase, an object is detected by the ultrasonic sensors (step S5), the starting operation is then terminated immediately in step S6, i.e., there is no further acceleration, but no braking operation is initiated either. In step S7 the plausibility of the located object is tested. At a low plausibility, the system then branches off to step S3 and the warning to the driver is output. The starting operation remains suspended until the object has disappeared or the driver intervenes. If the plausibility is high in step S7, the emergency braking operation is initiated in step S8 by initial starting regulator 26. There is a jump back to step S1 so that the vehicle is able to start moving again when the lane is free.

If no object has been detected in the near-range during the initial starting phase (step S5), a check is performed in step S9 to determine whether distance D traveled by vehicle 34 since the start of the starting operation is greater than distance ILSD. If this is not the case, there is a jump back to step S5. Otherwise in step S10, control of the starting operation is taken over by regular starting regulator 24.

What is claimed is:

1. A start assist system for a host motor vehicle, comprising:
 a long-range locating system configured to determine a location of vehicles traveling ahead of the host vehicle;
 a starting regulator configured to initiate and control a starting operation;
 a near-range locating system configured to determine a location of objects directly ahead of the host vehicle;
 a decision unit configured to suppress a starting operation in response to a signal from the near-range locating system; and
 an initial starting regulator configured to define a maximum speed for an initial phase of the starting operation so that a stopping distance of the vehicle is shorter than a locating depth of the near-range locating system.

2. The start assist system as recited in claim 1, wherein the near-range locating system is formed by at least one ultrasonic sensor.

3. The start assist system as recited in claim 2, wherein the ultrasonic sensors are part of a park assist system.

4. The start assist system as recited in claim 1, wherein the initial starting regulator is configured to brake the vehicle to a standstill when an object is detected by the near-range locating system.

5. The start assist system as recited in claim 1, wherein the decision unit is configured designed to transfer control of the starting operation from the initial starting regulator to a regular starting regulator that allows higher speeds when a distance traveled by the vehicle since a start of the starting operation is greater than a defined distance.

6. The start assist system as recited in claim 5, wherein a sum of a range of the near-range locating system and the defined distance corresponds to a maximum distance between an object and the vehicle when the object is within a lane of the vehicle and outside locating range of the long-range locating system.

7. The start assist system as recited in claim 5, further comprising:
   a plausibility module configured to evaluate a plausibility of locating data of the near-range locating system;
   wherein the decision unit is configured to prompt the initial starting regulator to a braking operation only when the plausibility of the locating data is above a certain threshold value.

8. The start assist system as recited in claim 7, wherein the decision unit is configured to terminate an acceleration operation during a starting phase when the near-range locating system has determined the location of an object and the plausibility of the locating data is lower than the threshold value.

9. The start assist system as recited in claim 1, further comprising:
   a warning signal generator configured to output a warning signal to a driver when the near-range locating system has determined the location of an object.

10. The start assist system as recited in claim 1, wherein the stopping distance of the vehicle is shorter than a locating depth of the near-range locating system by a certain safety margin.

11. The start assist system as recited in claim 1, wherein the decision unit is configured to activate and deactivate two starting regulators.

12. The start assist system as recited in claim 1, wherein the speed is limited by directly limiting the speed.

13. The start assist system as recited in claim 1, wherein the speed is limited by limiting the starting acceleration.

* * * * *